US012674260B2

(12) United States Patent
Suzuki

(10) Patent No.: US 12,674,260 B2
(45) Date of Patent: Jul. 7, 2026

(54) APPARATUS FOR MODIFYING TEXTILE PRODUCTS AND LEATHER PRODUCTS, AND METHOD FOR MODIFYING TEXTILE PRODUCTS AND LEATHER PRODUCTS

(71) Applicant: HAP CO., LTD., Tokyo (JP)

(72) Inventor: Moto Suzuki, Tokyo (JP)

(73) Assignee: HAP CO., LTD., Tokyo (JP)

( * ) Notice: Subject to any disclaimer, the term of this patent is extended or adjusted under 35 U.S.C. 154(b) by 37 days.

(21) Appl. No.: 18/284,699

(22) PCT Filed: Mar. 31, 2022

(86) PCT No.: PCT/JP2022/016888
§ 371 (c)(1),
(2) Date: Sep. 28, 2023

(87) PCT Pub. No.: WO2022/211101
PCT Pub. Date: Oct. 6, 2022

(65) Prior Publication Data

US 2024/0167206 A1 May 23, 2024

(30) Foreign Application Priority Data

Mar. 31, 2021 (JP) ................................ 2021-060958

(51) Int. Cl.
*D06B 1/02* (2006.01)
*B05B 7/04* (2006.01)
(Continued)

(52) U.S. Cl.
CPC .............. *D06B 1/02* (2013.01); *B05B 7/0416* (2013.01); *B05B 7/2486* (2013.01);
(Continued)

(58) Field of Classification Search
None
See application file for complete search history.

(56) References Cited

U.S. PATENT DOCUMENTS 1,889,048 A * 11/1932 Haggenmacher ........ D06B 3/08 68/161
3,064,458 A * 11/1962 Grimes .................... D06B 3/18 68/43
(Continued)

FOREIGN PATENT DOCUMENTS

CN 210177115 U 3/2020
JP S63-075167 A 4/1988
(Continued)

OTHER PUBLICATIONS

PCT/ISA/210, "International Search Report for PCT International Application No. PCT/JP2022/016888," Jun. 21, 2022.

*Primary Examiner* — Jethro M. Pence
(74) *Attorney, Agent, or Firm* — HAUPTMAN HAM, LLP

(57) ABSTRACT

Provided are an apparatus for modifying textile products and leather products and a method for modifying textile products and leather products suitable for modifying textile products and leather products. The apparatus for modifying textile products and leather products includes a storage tub having an internal space that stores the textile products and/or the leather products, and a spray section that sprays a processing liquid containing a functional substance along with a gas toward the textile products and/or the leather products in the internal space of the storage tub, and the spray section includes a two-fluid nozzle.

5 Claims, 8 Drawing Sheets

(51) Int. Cl.

| | |
|---|---|
| ***B05B 7/24*** | (2006.01) |
| ***C14C 11/00*** | (2006.01) |
| ***D06B 5/26*** | (2006.01) |
| ***D06G 1/00*** | (2006.01) |
| ***D06M 11/05*** | (2006.01) |
| ***D06M 11/44*** | (2006.01) |
| ***D06M 11/45*** | (2006.01) |
| ***D06M 11/46*** | (2006.01) |
| ***D06M 11/79*** | (2006.01) |
| ***D06M 13/00*** | (2006.01) |
| ***D06M 13/148*** | (2006.01) |
| ***D06M 15/233*** | (2006.01) |
| ***D06M 15/263*** | (2006.01) |
| ***D06M 15/643*** | (2006.01) |
| ***D06M 16/00*** | (2006.01) |
| ***D06M 101/06*** | (2006.01) |

(52) U.S. Cl.

CPC .............. *B05B 7/2491* (2013.01); *D06B 5/26* (2013.01); *D06G 1/005* (2013.01); *D06M 11/05* (2013.01); *D06M 11/44* (2013.01); *D06M 11/45* (2013.01); *D06M 11/46* (2013.01); *D06M 11/79* (2013.01); *D06M 13/005* (2013.01); *D06M 13/148* (2013.01); *D06M 15/233* (2013.01); *D06M 15/263* (2013.01); *D06M 15/6436* (2013.01); *C14C 11/003* (2013.01); *D06M 2101/06* (2013.01); *D06M 2200/01* (2013.01)

(56) References Cited

U.S. PATENT DOCUMENTS

| | | | | |
|---|---|---|---|---|
| 4,761,305 | A | 8/1988 | Ochiai | |
| 5,314,120 | A * | 5/1994 | Nau | B05B 7/2486 239/155 |
| 5,461,742 | A * | 10/1995 | Pasad | D06F 58/30 34/517 |
| 8,234,998 | B2 * | 8/2012 | Krogman | D06M 23/06 118/313 |
| 11,179,744 | B2 * | 11/2021 | Morgan | B01F 25/30 |

FOREIGN PATENT DOCUMENTS

| | | | |
|---|---|---|---|
| JP | H10-057294 | A | 3/1998 |
| JP | 2000-226760 | A | 8/2000 |
| JP | 2016-030069 | A | 3/2016 |
| JP | 2018-122250 | A | 8/2018 |

* cited by examiner

FIG. 8

| | Example 1 | Example 2 | Example 3 | Example 4 |
|---|---|---|---|---|
| Means for attaching functional substance | Stirring in water | Spraying via nozzle | Spraying via nozzle | Stirring in water |
| Functions to be imparted (purpose of modification) | Deodorizing function Antibacterial function Water absorption and diffusion function | Deodorizing function Antibacterial function Water absorption and diffusion function | Deodorizing function Antibacterial function Water absorption and diffusion function | Anti-see-through function Sweat stain prevention function |
| Textile products | Six used T-shirts (approximately 900 g in total) | Six used T-shirts (approximately 900 g in total) | Six unused T-shirts (approximately 900 g in total) | Six used T-shirts (approximately 900 g in total) |
| Refinement step | Necessary | Necessary | Unnecessary | Necessary |
| Water used to attach processing liquid | Large amount | Small amount | Small amount | Large amount |
| Spin step carried out when processing liquid is attached | Spin step required | No spin step required | No spin step required | Spin step required |
| Drying means | Hot air | Hot air | Non-forcible drying | Hot air |
| Proportion of attached functional chemical | Lower than in Examples 2 and 3 | Higher than in Example 1 (due to lower dilution with water and no spin step) | Higher than in Example 1 (due to lower dilution with water and no spin step) | |
| Processing liquid | [Processing 1] Processing liquid B: 40.5 g<br><br>[Processing 2] Processing liquid C: 63 g Processing liquid D: 45 g | [Processing 1] Processing liquid B: 40.5 g<br><br>[Processing 2] Processing liquid C: 63 g Processing liquid D: 45 g | [Processing 1] Processing liquid B: 40.5 g<br><br>[Processing 2] Processing liquid C: 63 g Processing liquid D: 45 g | [Processing 1] Processing liquid E: 72 g<br><br>[Processing 2] Processing liquid F: 45 g |
| Component that improves adsorption of functional substance to the textile products | Polycationic surfactant | Polycationic surfactant | Polycationic surfactant | Acrylic acid alkyl ester/styrene copolymer |
| Characteristics of processing liquid | Cationic processing liquid imparts deodorizing function in processing 1, and anionic processing liquid imparts antibacterial function in processing 2 | Cationic processing liquid imparts deodorizing function in processing 1, and anionic processing liquid imparts antibacterial function in processing 2 | Cationic processing liquid imparts deodorizing function in processing 1, and anionic processing liquid imparts antibacterial function in processing 2 | Not suitable for use of nozzle because processing liquid clogs nozzle. Not suitable for use of nozzle because color (white) of processing liquid causes stains. |
| JIS L1930 wash resistance test | No change in attachment of functional substance after washing ten times | No change in attachment of functional substance after washing ten times | No change in attachment of functional substance after washing ten times | No change in attachment of functional substance after washing ten times |

APPARATUS FOR MODIFYING TEXTILE PRODUCTS AND LEATHER PRODUCTS, AND METHOD FOR MODIFYING TEXTILE PRODUCTS AND LEATHER PRODUCTS

RELATED APPLICATIONS

The present application is National Phase of International Application No. PCT/JP2022/016888 filed Mar. 31, 2022, and claims priority from Japanese Application No. 2021-060958, filed Mar. 31, 2021, the disclosure of which is hereby incorporated by reference herein in its entirety.

BACKGROUND OF THE INVENTION

Field of the Invention

The present invention relates to an apparatus for modifying textile products and leather products, and a method for modifying textile products and leather products.

Description of the Related Art

In recent years, attempts have been made to impart functions, such as flame retardancy, water repellency, UV protection capability, antibacterial capability, bactericidal capability, and stain resistance (self-cleaning capability), to textile products, such as woven fabrics, knitted fabrics, and nonwoven fabrics. Imparting functions to a textile product as described above is typically performed by kneading a functional substance that imparts a desired function into resin that constitutes the textiles. Imparting functions to a textile product as described above is performed during the manufacture of the textiles that constitute the textile product, that is, functions are not imparted to a textile product, such as clothing, through modification after the product is completed.

Social demands require textile products, mainly clothing, to have a variety of functions below. The spread of COVID-19 requires providing antiviral and antibacterial functions. In addition, as humanity continues to age, it has become important to maintain sustainable health, and functions such as promoting blood circulation, improving immunity, and recovering from fatigue are required. To change awareness of SDGs and sustainability, or to address the increasingly serious problem of mass waste of clothing, there is a need to use recycled materials and reuse clothing as is. Furthermore, reuse is required to be performed with the quality more improved. In connection, for example, with the use of recycled materials, an anti-pilling function is required to solve the problem of reduced durability of clothing due to pilling. Due to the global warming, there is a need to (1) prevent heatstroke, (2) reduce electricity consumption by reducing use of air conditioners, and (3) prevent mosquitoes. To this end, it is required to develop, for example, products that provide a cooling sensation, products that do not tend to become sticky even due to sweating, products that do not become transparent when wet with sweat, and products that can reduce sweat stains.

On the other hand, the mainstream means of related art for producing a functional textile product has been kneading textiles into a raw material. The means for kneading textiles into a raw material, however, takes several months or longer to develop and commercialize a product. The manufacturing step involves high temperatures that allow melting and chemical bonding. The manufacturing step also requires use of a large amount of water. In addition, when the means for kneading textiles into a raw material is used, it is necessary to produce a large quantity of products at once. It has been therefore inconceivable at all, for example, that a final consumer adds functions to a product for personal use when the product was in the consumer's hands.

If a function can be imparted to used clothing in the original form thereof (in the form of clothing), the social demands described above can be satisfied, but the function impartation could not be achieved by kneading textiles into a raw material.

Japanese Patent Laid-Open No. 2016-30069 discloses a front-loading washing machine including a drum that accommodates laundry and a shower nozzle that sprays water diffusely in the form of a shower toward the drum while swirling the water.

As described above, functions have been imparted to conventional textile products during the manufacture of the textiles that constitute the textile product, that is, functions are not imparted to a textile product, such as clothing, through modification after the product is completed. On the other hand, if functions can be imparted to a textile product, that is, if the textile product can be modified after it is manufactured, the purchaser of the textile product can select any function to be imparted and modify the textile product. The same holds true for a leather product. The present inventors have investigated the possibility of such modification of textile products and leather products.

There is, however, no method or apparatus of related art for modifying textile products and leather products. For example, in a front-loading washing machine described in Japanese Patent Laid-Open No. 2016-30069, the shower nozzle is used for knock wash, push wash, and shower rinse, and is not used to modify textile products or leather products.

An object of the present invention is therefore to provide an apparatus for modifying textile products and leather products and a method for modifying textile products and leather products suitable for modifying textile products and leather products.

The present invention aims to achieve (1) providing the means for imparting a function to textile products and leather products through post-processing, that is, making used clothing, for example, to be a target to which a function is imparted,
(2) providing the means for imparting such a function at room temperature,
(3) providing the means for imparting such a function in a short time,
(4) providing the means for imparting a function without using a large amount of water,
(5) providing the means for imparting a function without a spin step,
(6) providing the means for imparting the function of achieving high wash resistance, and
(7) providing an apparatus capable of imparting a variety of functions.

SUMMARY OF THE INVENTION

As a result of intensive studies to achieve the objects described above, the present inventors focused on the possibility of modification of textile products and leather products once manufactured as final products by spraying and imparting a functional substance to the textile products and leather products. The present inventors, however, faced a problem that the nozzles installed in washing machines and other similar apparatuses of related art are only intended for cleaning and rinsing textile products, and are not suitable for modifying textile products and leather products.

In view of the problem described above, and as a result of continued studies conducted by the present inventors, the present inventors have found that using a two-fluid nozzle as a spraying nozzle allows uniform impartation of a functional substance to the surfaces of textile products and leather products so that the textile products and the leather products can be efficiently modified. Based on the findings described above, the present inventors further conducted studies and attained the present invention.

The present invention is summarized as follows:

(1) An apparatus for modifying textile products and leather products, the apparatus including a storage tub having an internal space that stores the textile products and/or the leather products, and a spray section that sprays a processing liquid containing a functional substance along with a gas toward the textile products and/or the leather products in the internal space of the storage tub, the spray section including one or a plurality of two-fluid nozzles.

(2) The apparatus for modifying textile products and leather products described in (1), in which the spray section includes a plurality of the two-fluid nozzles, a gas supplier that supplies the two-fluid nozzles with the gas, and a processing liquid supplier that supplies the two-fluid nozzles with the processing liquid.

(3) The apparatus for modifying textile products and leather products described in (2), in which the gas supplier has an annular shape, and the plurality of two-fluid nozzles are each supported by the gas supplier and disposed apart from adjacent two-fluid nozzles by a fixed distance.

(4) The apparatus for modifying textile products and leather products described in (1), in which the storage tub is rotatable.

(5) The apparatus for modifying textile products and leather products described in (4), in which an axis of rotation of the storage tub inclines with respect to a vertical direction or extends along a horizontal direction.

(6) The apparatus for modifying textile products and leather products described in (1), further including a heating apparatus capable of heating the internal space of the storage tub.

(7) The apparatus for modifying textile products and leather products described in (1), in which the apparatus is a washing machine.

(8) A method for modifying textile products and leather products, the method including a spray step of spraying a processing liquid containing a functional substance along with a gas via a two-fluid nozzle onto the textile products and/or the leather products.

(9) The method for modifying textile products and leather products described in (8), in which in the spray step, water is sprayed along with the processing liquid onto the textile products, and a total weight of the processing liquid and the water is one to two times a weight of the textile products.

(10) The method for modifying textile products and leather products described in (8), in which the spray step is followed by a drying step without involving a spin step.

(11) The method for modifying textile products and leather products described in (8), in which in the spray step, the textile products and/or the leather products are stirred when the processing liquid is sprayed.

(12) The method for modifying textile products and leather products described in (8), further including a fixation step, after the spray step, of heating the textile products and/or the leather products to fix the functional substance to the textile products and/or the leather products.

(13) The method for modifying textile products and leather products described in (8), further including a wetting step, before the spray step, of wetting the textile products and/or the leather products with a liquid.

The configuration described above can provide an apparatus for modifying textile products and leather products and a method for modifying textile products and leather products suitable for modifying textile products and leather products.

The configuration described above can provide the following means for:

(1) providing the means for imparting a function to textile products and leather products through post-processing, that is, making used clothing, for example, to be a target to which a function is imparted, (2) providing the means for imparting such a function at room temperature, (3) providing the means for imparting such a function in a short time, (4) providing the means for imparting a function without using a large amount of water, (5) providing the means for imparting a function without a spin step, (6) providing the means for imparting the function of achieving high wash resistance, and (7) providing an apparatus capable of imparting a variety of functions.

BRIEF DESCRIPTION OF THE DRAWINGS

FIG. 8 is a table showing characteristic points of Examples 1 to 4 of the present invention.

DETAILED DESCRIPTION OF THE PREFERRED EMBODIMENTS

A preferable embodiment of an apparatus for modifying textile products and leather products and a method for modifying textile products and leather products according to the present invention will be described below in detail with reference to the drawings. The apparatus for modifying textile products and leather products will first be described, and the method for modifying textile products and leather products will then be described.

1. Apparatus for Modifying Textile Products and Leather Products

Figure 1:
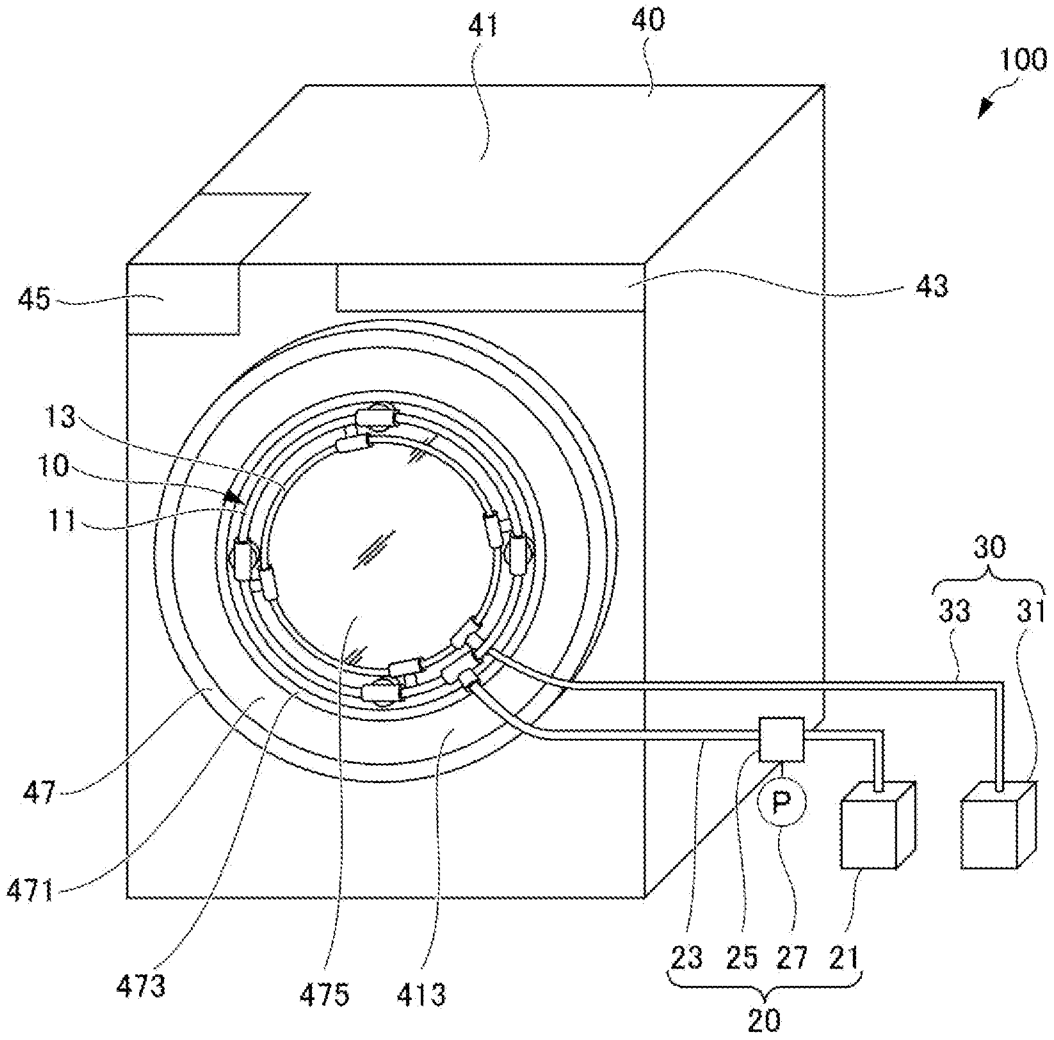
FIG. 1 is a schematic view of a modification apparatus according to an embodiment of the present invention.
Figure 2:
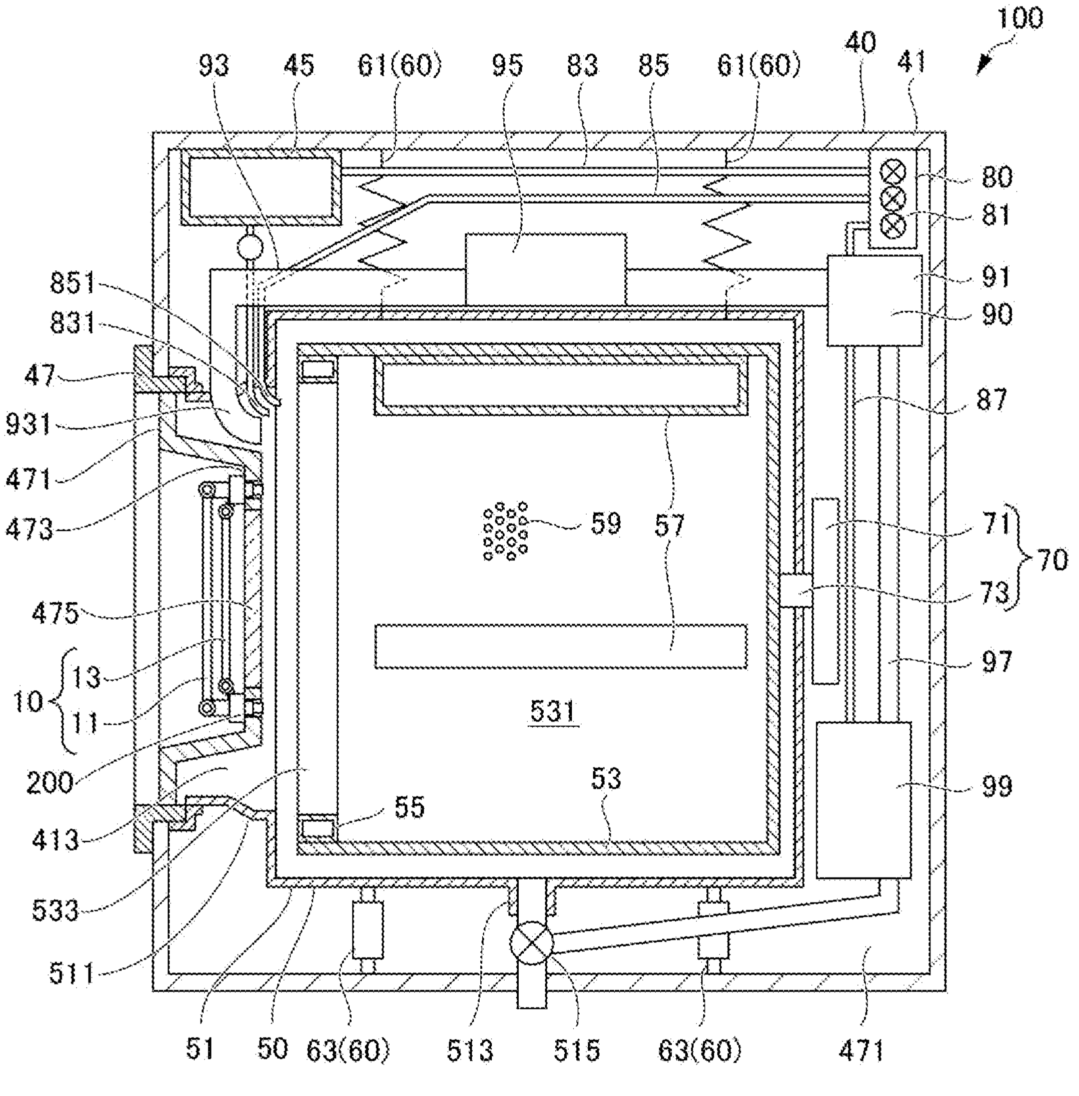
FIG. 2 is a schematic cross-sectional view for describing a functional configuration of the modification apparatus shown in FIG. 1.
Figure 3:
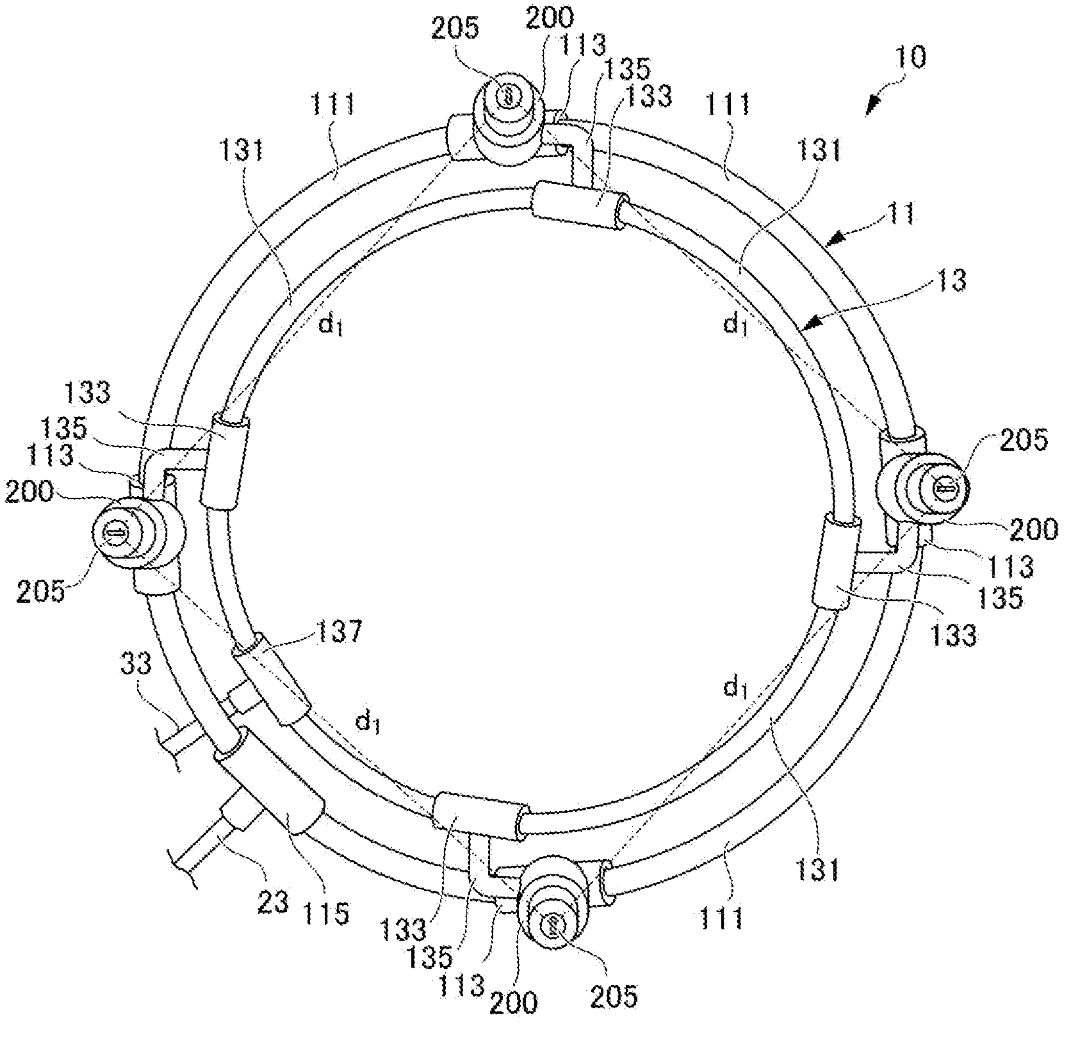
FIG. 3 is a perspective view showing an overview of a spray section provided in the modification apparatus shown in FIG. 1.
Figure 4:
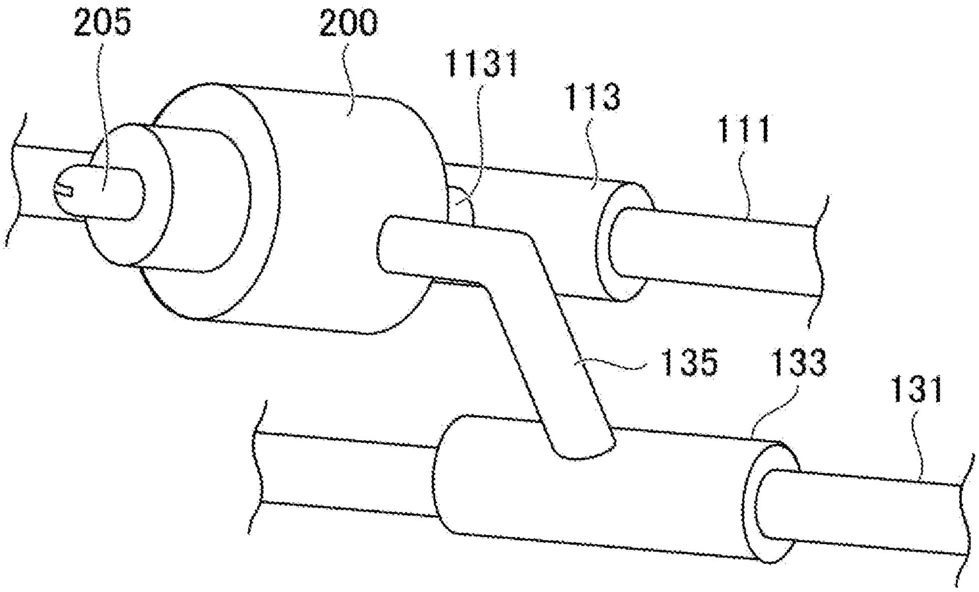
FIG. 4 is an enlarged perspective view of a vicinity of a two-fluid nozzle provided in the spray section shown in FIG. 3.
Figure 5:
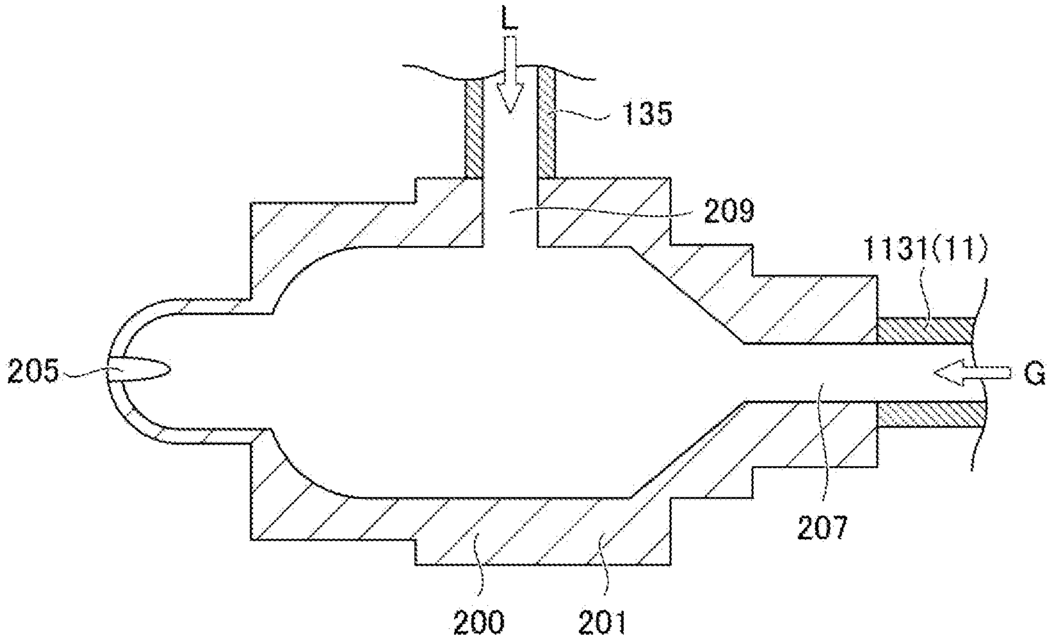
FIG. 5 is a partially enlarged cross-sectional view of the two-fluid nozzle provided in the spray section shown in FIG. 3.

The apparatus for modifying textile products and leather products according to the present embodiment (hereinafter also simply referred to as "modification apparatus") will first be described. FIG. 1 is a schematic view of the modification apparatus according to the present embodiment. FIG. 2 is a schematic cross-sectional view for describing the functional configuration of the modification apparatus shown in FIG. 1. FIG. 3 is a perspective view showing an overview of a spray section provided in the modification apparatus shown in FIG. 1. FIG. 4 is an enlarged perspective view of a vicinity of a two-fluid nozzle provided in the spray section shown in FIG. 3. FIG. 5 is a partially enlarged cross-sectional view of the two-fluid nozzle provided in the spray section shown in FIG. 3. In the drawings, note that the size of each member is emphasized as appropriate for ease of description, so that the scale and size of each member are not equal to the actual values.

A modification apparatus 100 shown in FIGS. 1 and 2 is a front-loading washing machine equipped with a spray system formed of a spray section 10, a gas supplier 20, and a processing liquid supplier 30, and the spray system imparts a functional substance to target textile products and/or leather products (hereinafter also referred to as "target objects") placed in the washing machine. The modification apparatus 100 includes the spray section 10, the gas supplier 20, the processing liquid supplier 30, an enclosure 40, a wash tub 50, a support 60, a driver 70, a water supplier 80, and a dryer 90.

The spray section 10 shown in FIG. 1 receives a gas and a processing liquid supplied from the gas supplier 20 and the processing liquid supplier 30, respectively, and sprays the processing liquid onto the target objects placed in the wash tub 50. The spray section 10 will be described later in detail.

The gas supplier 20 is provided outside the enclosure 40. The gas supplier 20 includes a compressor 21, a gas supply tube 23, a pressure regulating valve 25, and a pressure gauge 27. The compressor 21 is connected to the gas supply tube 23, compresses the air present around the compressor 21, and supplies the air to the spray section 10 via the gas supply tube 23.

The gas supply tube 23 links the compressor 21 to a linkage section 115 of the spray section 10 and conveys the air from the compressor 21 to the spray section 10. The pressure regulating valve 25 is disposed in the middle of the gas supply tube 23 and adjusts the pressure of the air supplied from the compressor 21 and flowing through the gas supply tube 23 to any intended value. The pressure regulating valve 25 can stop the gas supply. The pressure gauge 27 is disposed along with the pressure regulating valve 25 in the middle of the gas supply tube 23, and measures the pressure of the air flowing in the gas supply tube 23 from the pressure regulating valve 25 toward the spray section 10.

The processing liquid supplier 30 is provided outside the enclosure 40. The processing liquid supplier 30 includes a processing liquid storage 31 and a processing liquid supply tube 33. The processing liquid storage 31 stores the processing liquid containing the functional substance. The processing liquid supply tube 33 has one end immersed in the processing liquid stored in the processing liquid storage 31, and the other end linked to a linkage section 137 of the spray section 10, and conveys the processing liquid from the processing liquid storage 31 to the spray section 10.

The enclosure 40 houses the sections that constitute the modification apparatus 100. The enclosure 40 includes an enclosure body 41, a panel section 43, a detergent loader 45, and an opening/closing door 47. The enclosure body 41 is a casing that has a substantially rectangular parallelepiped outer shape and has a storage space 411, which houses the sections that constitute the modification apparatus 100. The enclosure body 41 has a loading port 413 near the center of the front surface of the enclosure body 41, and the opening/closing door 47 is attached to close the loading port 413.

The panel section 43 is a panel disposed at an upper front portion of the enclosure body 41 and used to operate the modification apparatus 100. The panel section 43 is provided with input and output apparatuses for operating the modification apparatus 100, for example, buttons, levers, dials, and displays. The panel section 43 is configured to be communicable with a control apparatus that is not shown, and information input via the input apparatus in the panel section 43 is transmitted to the control apparatus and used to control the modification apparatus 100.

The detergent loader 45 is a container for loading and storing a detergent. The detergent loader 45 is provided near an upper portion of the enclosure body 41 and is configured to be openable and closable. The detergent loader 45 stores processing agents such as a detergent and a softener for wash, and the processing agents are delivered to a drum 53 by water supplied through a detergent supply pipe 83 of the water supplier 80, which will be described later.

The opening/closing door 47 is configured to be openable/closable near the center of the front surface of the enclosure 40 so as to cover the loading port 413. The opening/closing door 47 includes a door body 471, which has a central portion protruding toward the storage space 411 of the enclosure 40 to form an annular bottom 473, and a window 475, which is made of a transparent material, for example, a glass material and closes an opening provided at the center of the bottom 473, as shown in FIG. 2. The spray section 10, which has an annular shape, is attached to the bottom 473 and along the annular shape thereof, as shown in FIGS. 1 and 2.

The wash tub 50 shown in FIG. 2 includes an outer tub 51 and the drum 53. The outer tub 51 has a bottomed cylindrical shape having one side that opens toward the loading port 413 and the other side that is opposite from the loading port 413 and is closed, and the outer tub 51 houses the drum 53. The portion of the outer tub 51 where the opening is formed extends toward the loading port 413, and isolates the storage space 411 of the enclosure 40 from the interior of the outer tub 51 to prevent the liquid from leaking to the exterior of the outer tub 51. An openable and closable drain port 513 is provided at the bottom of the outer tub 51, and the liquid and the gas in the wash tub 50 are drained via the drain port 513 as necessary.

The drum 53 is provided rotatably around the axial direction in the outer tub 51, and has a bottomed cylindrical shape having one side that opens toward the loading port 413 and the other side that is opposite from the loading port 413 and is closed. The drum 53 is a storage tub having an internal space 531, and stores the target objects. The drum 53 is provided with an annular balancer 55 disposed at the wall surface facing the opening of the drum 53 and extending along the circumferential direction. The drum 53 is provided with a plurality of baffles 57 on the inner circumferential surface of the drum 53 at equal intervals in the circumferential direction. A large number of spin holes 59 are formed in the inner circumferential surface of the drum 53.

The axis of rotation of the drum 53 extends along the horizontal direction in the present embodiment. That is, the axis of rotation of the drum 53 inclines with respect to the horizontal direction by an angle of 10° or less. Since the axis of rotation of the drum 53 extends along the horizontal direction as described above, rotating the drum 53 to stir the target objects when the processing liquid is sprayed allows the processing liquid to be more uniformly imparted onto the target objects.

The support 60 includes a plurality of springs 61 and a plurality of dampers 63, which are disposed in the enclosure 40 and elastically support the wash tub 50. The driver 70 includes a drive motor 71 and a drive shaft 73. The drive motor 71 generates a torque capable of rotating the drum 53 around the axial direction via the drive shaft 73.

The water supplier 80 receives water supplied from a water source, such as a tap, and supplies the water to each of the sections of the apparatus. The water supplier 80 includes a distributor 81, a detergent supply pipe 83, a water supply pipe 85, and a cooling water supply pipe 87. The distributor 81 is connected to the water source, such as a tap, and distributes the water to the detergent supply pipe 83, the water supply pipe 85, and the cooling water supply pipe 87 via a plurality of provided openable/closable valves. The detergent supply pipe 83 passes through the detergent loader 45 to recover the processing agents, such as a detergent and a softener, and loads a liquid containing the processing agents into the drum 53 from the side facing the opening of the drum 53 via a nozzle 831. The water supply pipe 85 supplies the water to the drum 53 via a nozzle 851, for example, for rinsing or dilution of wash liquid. The cooling water supply pipe 87 supplies cooling water to a heat exchanger 99 of the dryer 90.

The dryer 90 is a dryer based on heater drying. The dryer 90 includes an air blower 91, an air blow pipe 93, a heater 95, a recovery pipe 97, and the heat exchanger 99. The air blower 91 is a fan, draws air from the wash tub 50 through the recovery pipe 97, and sends dry air into the wash tub 50 again through the air blow pipe 93. The heater 95 is attached to the middle of the air blow pipe 93, and the air heated by the heater 95 is sent into the internal space 531 of the wash tub 50 via an air blow nozzle 931 provided at the tip of the air blow pipe 93. Heating the air to be sent into the wash tub 50 as described above allows reduction in the moisture of the air to be sent into the wash tub 50, and further allows heating of the storage space 411 of the wash tub 50. That is, the dryer 90 also functions as a heating apparatus capable of heating the storage space 411 of the wash tub 50.

The recovery pipe 97 is linked to the drain port 513 of the wash tub 50, and uses negative pressure produced by the air blower 91 to draw out and recover moist air from the internal space 531 of the wash tub 50 and deliver the recovered air to the air blower 91. The heat exchanger 99 is disposed in the middle of the recovery pipe 97, and the air passing through the recovery pipe 97 is cooled by the cooling water supplied via the cooling water supply pipe 87 in the heat exchanger 99, and the water vapor in the air solidifies into water. The water produced by the solidification flows backward through the recovery pipe 97 and is drained out of the modification apparatus 100 via the drain port 513.

The spray section 10 will next be described. As described above, the spray section 10 shown in FIG. 1 receives the air and the processing liquid supplied from the gas supplier 20 and the processing liquid supplier 30, respectively, and sprays the processing liquid onto the target objects placed in the wash tub 50. The spray section 10 includes an annular gas distributor 11, an annular processing liquid distributor 13, and two-fluid nozzles 200, as shown in FIGS. 1 and 2. The spray section 10 is so configured that the annular gas distributor 11 and the annular processing liquid distributor 13 are attached to and along the annular bottom 473 of the opening/closing door 47, and that the nozzle tip of each of the two-fluid nozzles 200 passes through the bottom 473 and is directed toward the storage space 411 of the wash tub 50. The portions of the spray section 10 will be described below in detail.

The gas distributor 11 and the processing liquid distributor 13 each have an annular shape, and are connected to the two-fluid nozzles 200, as shown in FIG. 3. The gas distributor 11 includes five tubes 111 arranged in an annular shape, four joints 113 each disposed between adjacent tubes 111, and the linkage section 115, which links the gas supply tube 23 to the tubes 111 adjacent thereto. The joints 113 each include a branch pipe 1131, which is connected to the base end of the corresponding two-fluid nozzle 200, as shown in FIG. 4. The air supplied through the gas supply tube 23 is thus introduced into the gas distributor 11 via the linkage section 115, and is delivered to each of the joints 113 through the tubes 111 on opposite sides of the linkage section 115. The delivered air is then supplied to each of the two-fluid nozzles 200 via the base end thereof through the branch pipe 1131 of the joint 113.

The processing liquid distributor 13 includes five tubes 131 arranged in an annular shape, four joints 133 each disposed between adjacent tubes 131, branch pipes 135, which connect the joints 133 to the two-fluid nozzles 200, and a linkage section 137, which links the processing liquid supply tube 33 to the tubes 131 adjacent thereto, as shown in FIG. 3. The branch pipes 135 each branch off the middle of the joint 133 and are extended and connected to the side of the two-fluid nozzle 200, as shown in FIGS. 3 and 4. The processing liquid supplied through the processing liquid supply tube 33 is thus introduced into the processing liquid distributor 13 via the linkage section 137, and is delivered to each of the joints 133 through the tubes 131 on opposite sides of the linkage section 137. The delivered processing liquid is then supplied to each of the two-fluid nozzles 200 from the side thereof via the joint 133 and the branch pipe 135.

The two-fluid nozzles 200 are supported by the joints 113 of the gas distributor 11 and disposed along the annular gas distributor 11, as shown in FIG. 3. As described above, in the present embodiment, the two-fluid nozzles 200 are each used as a nozzle that sprays the processing liquid. The processing liquid can thus be uniformly and efficiently imparted to the target objects (textile products and/or leather products) placed in the internal space 531 of the drum 53.

In detail, the shower nozzle used in a washing machine of related art is used only for knock wash, push wash, and shower rinse, and aims to press the target objects with relatively high water pressure. When the processing liquid is imparted to the target objects by using such a shower nozzle, the processing liquid via the shower nozzle collides locally with the target objects, but does not spread over the entire target objects. Furthermore, an attempt to impart the processing liquid to the entire target objects undesirably requires a large amount of processing liquid. Moreover, since the processing liquid via the shower nozzle collides locally with the target objects, the concentration of functional substance in the processing liquid needs to be relatively low to evenly and uniformly impart the processing liquid to the target objects. In this case, a lot of energy, for example, thermal energy is required to remove a large amount of solvent in the processing liquid from the target objects.

In contrast, the two-fluid nozzles 200 are used as the nozzle, in the present embodiment. The two-fluid nozzles 200 are each capable of atomizing a liquid into fine particles (having size of 0.1 μm or smaller, for example) and spraying the atomized liquid, as compared with a normal shower nozzle and a single-fluid nozzle. Therefore, when the two-fluid nozzles 200 are used as the nozzle in the present embodiment, a mist of fine particles of the processing liquid can be imparted uniformly to a wide range of the target objects. Since the processing liquid can thus be uniformly imparted to the target objects, the amount of processing liquid to be used can be relatively small, and the concentration of the functional substance in the processing liquid to be used can be relatively high. In addition, in this case, the amount of energy required to remove a large amount of solvent in the processing liquid from the target objects can be relatively small.

When the two-fluid nozzles 200 are used, the processing liquid in the form of fine mist is imparted to the target objects, so that the processing liquid attaches primarily to the surfaces of the target objects. Many functional substances, represented by water repellents and photocatalysts, however, perform the functions thereof at the surfaces of the target objects. The two-fluid nozzles 200, which allow a large amount of processing liquid to attach to the surfaces of the target objects, are rather more suitable for impartation of functionality to the target objects, and also allow reduction in the amount of processing liquid that permeates the target objects, are therefore efficient nozzles.

The surface formed by a plurality of two-fluid nozzles 200 is roughly perpendicular to the axis of rotation of the drum 53. The processing liquid can thus be uniformly sprayed into the entire internal space 531, and even a small amount of processing liquid can be imparted more uniformly to the target objects.

Furthermore, the two-fluid nozzles 200 are each disposed equally apart from the adjacent two-fluid nozzle 200. More specifically, a nozzle hole 205 of each of the two-fluid nozzles 200 is disposed apart by a distance $d_1$ from the nozzle holes 205 of the adjacent two-fluid nozzles 200. The processing liquid can thus be uniformly sprayed into the entire internal space 531, and even a small amount of processing liquid can be imparted uniformly to the target objects.

FIG. 5 is a diagrammatic partial cross-sectional view of a two-fluid nozzle 200. Note that parts and structures unnecessary for the description are omitted in FIG. 5. In the present embodiment, the two-fluid nozzles 200 are each what is called an inside-gas-type internal mixing nozzle. That is, the two-fluid nozzles 200 each mix a gas (air in present embodiment) and a liquid (processing liquid in present embodiment) with each other in the two-fluid nozzle 200. In the mixing operation performed by each of the two-fluid nozzles 200, the gas passes through the center of the nozzle, and the liquid is present around the gas.

The two-fluid nozzle 200 shown in FIG. 5 includes a nozzle body 201 having a mixing space 203. A gas injection hole 207 is provided at the base end of the nozzle body 201, and the branch pipe 1131 of the joint 113 is connected to the gas injection hole 207. The gas is therefore supplied through the branch pipe 1131 of the joint 113. On the other hand, a processing liquid injection hole 209 is provided at the side of the nozzle body 201, and the branch pipe 135 branched off the joint 133 is connected to the processing liquid injection hole 209. The processing liquid is therefore supplied through the branch pipe 1131 of the joint 133. The nozzle hole 205 is provided at the tip of the nozzle body 201.

In the thus configured two-fluid nozzle 200, the air compressed by the compressor 21 is first injected via the base end of the nozzle body 201, and the processing liquid is drawn in by the flow of the compressed air generated in the mixing space 203 and introduced into the mixing space 203. The air and the processing liquid are then mixed with each other in the mixing space 203, and the processing liquid is sprayed in the form of a mist of fine particles via the nozzle hole 205 at the tip of the nozzle body 201.

As described above, the modification apparatus 100 according to the present embodiment includes the spray system including the spray section 10, and the spray section 10 includes the two-fluid nozzles 200. A functional substance can therefore be uniformly imparted onto the surfaces of the textile products and the leather products, allowing efficient modification of the textile products and the leather products. In the uniform impartation of the functional substance to the surfaces of the textile products and the leather products, the necessary amount of processing liquid can be relatively small. The energy required to remove the solvent in the processing liquid from the textile products and the leather products can therefore be reduced.

2. Method for Modifying Textile Products and Leather Products

The method for modifying textile products and leather products according to the present embodiment will next be described, including a method for using the modification apparatus 100 according to the present embodiment described above. In the following description, note that the method for modifying textile products and leather products according to the present invention will be described with reference to the case in which the modification apparatus 100 is used, but it goes without saying that the method for modifying textile products and leather products according to the present invention is not limited thereto and can be performed by using an apparatus different from the modification apparatus 100.

The method for modifying textile products and leather products according to the present embodiment (hereinafter also simply referred to as "modification method") includes a spray step of spraying a processing liquid containing a functional substance along with a gas via the two-fluid nozzles onto the textile products and/or the leather products.

The modification method according to the present embodiment includes, prior to the spray step, a preparation step of preparing the textile products and/or the leather products, and a wetting step of wetting the textile products and/or the leather products with the liquid, and further includes, after the spray step, a fixation step of fixing the functional substance to the textile products and/or the leather products by heating the textile products and/or the leather products. The steps described above will each be described below.

[2.1. Preparation Step]

In the present step, the textile products and/or the leather products are first prepared. The textile products and/or the leather products may include, but are not particularly limited to, decorations such as clothing, shoes, hats, stoles, and bags, general goods such as towels, handkerchiefs, and cloths, building materials such as curtains and wallpaper, industrial materials such as seat belts, vehicle sheet cloth, and textile materials and leather materials as the raw materials for the articles described above. In the case of the clothing, decorations, general goods, and other articles, in particular, functionality is usually imparted to them during manufacture of the textile materials. On the other hand, it is generally difficult to impart functionality to these products after they are manufactured. The modification method according to the present embodiment allows preferable impartation of a functional substance to textile products, which has been difficult to achieve in related art.

The form of the textile material that constitutes the textile products is not limited to a specific one and can be arbitrarily selected in accordance with the application of the textile products. The textile material can, for example, be single fibers, twisted yarn, composite yarn, hollow yarn, short fibers, woven fabric, knitted fabric, net, non-woven fabric, or cotton, and one of the materials described above can be used alone, or two or more of them can be used in combination.

The textile material that constitutes the textile products includes natural fibers and/or synthetic fibers. Examples of the natural fibers may include cotton, hemp, kenaf, pulp (chemical pulp, mechanical pulp), and other plant fibers, especially, natural cellulose fibers such as fibers derived from wood fibers, a variety of cellulose-based fibers including regenerated cellulose fibers such as viscose rayon, cupro, and acetate, polysaccharide fibers having amide or amino groups such as chitin and chitosan, animal hair such as wool, cashmere, and angora, and silk. One of the natural fibers described above can be used alone, or two or more of them can be used in combination.

Examples of the synthetic fibers may include acrylic-based fibers such as acrylic fibers and modacrylic fibers, polyester-based fibers such as polyethylene terephthalate, polytrimethylene terephthalate, polyethylene naphthalate, and polybutylene terephthalate, polyether-ester-based fibers, polyolefin-based fibers such as polyethylene and polypropylene, polyacrylate-based fibers, polyvinyl-chloride-based fibers, nylon fibers such as nylon 6 and nylon 66, polyamide fibers, polyimide fibers, aramid-based fibers, polyetherimide-based fibers, polyphenylene-sulfide fibers, polyurethane fibers, polyvinyl alcohol fibers, ethylene vinyl alcohol fibers, and polyarylate-based fiber. One of the synthetic fibers described above can be used alone, or two or more of them can be used in combination.

In the example described above, note that the textile products and the leather products have been separately described as the textile products and/or the leather products; however, it goes without saying that products containing both textile materials and leather materials as constituent materials are also encompassed in the textile products and/or the leather products in the present invention. The textile products and/or the leather products may be subjected to known processing and cleaning treatments as necessary.

[2.2. Wetting Step]

In the present step, the textile products and/or the leather products as the target objects are wetted with a liquid. Wetting the target objects with a liquid as described above allows improvement in the wettability of the target objects and improvement in the efficiency at which the processing liquid attaches to the target objects in the spray step. The liquid with which the target objects are wetted is not limited to a specific liquid, and may, for example, be water and/or a variety of organic solvents (such as methanol and ethanol).

The liquid used in the wetting step preferably contains components common to those in the solvent of the processing liquid, which will be described later. The wettability of the target objects is thus further improved. The liquid used in the wetting step is typically water in consideration of the functional configuration of the modification apparatus 100.

For example, the target objects are loaded into the internal space 531 of the drum 53 of the modification apparatus 100, and water is sprayed into the internal space 531 via the nozzle 851 of the water supplier 80. During this operation, the drum 53 is rotated by the driver 70 to adapt the water to the target objects as required. Finally, the drum 53 is rotated to spin the target objects.

For example, in the modification apparatus 100, the target objects may be washed (cleaned), rinsed, and spun to wet the target objects. Specifically, the target objects are loaded into the internal space 531 of the drum 53 of the modification apparatus 100, and a water composition containing detergent is loaded into the internal space 531 of the drum 53 via the nozzle 831 with the detergent in the detergent loader 45 recovered from the water supplier 80 via the detergent supply pipe 83. The drum 53 is then rotated to clean and spin the target objects. The target objects are then loaded into the internal space 531 of the drum 53 of the modification apparatus 100, and water is sprayed into the internal space 531 via the nozzle 851 of the water supplier 80. During this operation, the drum 53 is rotated by the driver 70 to remove the detergent from the target objects and remove unnecessary water via the drain port 513 as required. Finally, the drum 53 is rotated to spin the target objects. Washing, rinsing, and spinning the target objects as described above allows the target objects to be cleaned and wetted.

Note that the aforementioned specific example has been described with reference to the case where the liquid used in the wetting step is water, and when an organic solvent is used as the liquid, for example, the water source connected to the water supplier 80 may be changed to a liquid source containing the organic solvent. The present step may be omitted depending on the case.

[2.3. Processing Liquid Attachment Step (Spray Step)]

In the present step, the two-fluid nozzles 200 are used to spray the processing liquid containing a functional substance along with a gas onto the target objects. The functional substance thus uniformly attaches to the surfaces of the target objects.

The processing liquid will now be described. The processing liquid contains at least a functional substance and usually further contains a solvent that dissolves or disperses the functional substance.

The functional substance is a substance that imparts an intended function to the target objects. Examples of the intended function to be imparted may include water repellency, oil repellency, an antifouling function, a water absorption function, a quick drying function, a cooling function, an antibacterial function, a deodorizing function, a bacteria proliferation suppression function, an antiviral function, a photocatalyst function, a silver catalyst function, a self-cleaning function, a heat shielding function, a light shielding function (visible light and ultraviolet light blocking), a flame retardant function, an insect repellent function (such as mosquitoes and flies), a far infrared ray generation function, a pill prevention function, an antistatic function, weak acidity, ceramide, an anti-wrinkle function, an anti-allergic function, an anti-mite function, an anti-mold function, a softening function, a hardening function, and texture impartation.

The functional substance is not limited to a specific substance and may be any substance that can be fixed to the target objects and can perform an intended function. Examples of the functional substance may include photocatalysts, texture imparting agents, water repellents, humectants, water absorbing agents, light absorbing agents, fluorescent agents, and adsorbents, and one of the substances described above can be used alone, or two or more of the substances can be used in combination.

The photocatalyst is a substance that exhibits a catalytic action when exposed to electromagnetic waves such as light. Examples of the photocatalyst may include metal compounds such as oxides, nitrides, hydroxides, and composite salts of a metal element. Such a metal compound described above, depending on the type thereof, can be excited by optical radiation (ultraviolet radiation, in particular) to exhibit redox capability and decompose organic substances. The photocatalyst thus exhibits antibacterial, sterilizing and/or self-cleaning (antifouling) functions. Specific examples of the metal oxide may include metal oxides such as titanium dioxide, titanic acid, titanates, niobic acid, niobic acids, titanoniobic acids, zinc oxide, copper oxide, silver oxide, iron oxide, tungsten oxide, nickel oxide, molybdic acid, and tantalic acids; metal oxynitrides such as tantalum oxynitrides; metal complex salts such as bismuth vanadate salts; and metal hydroxide complex salts such as copper hydroxide phosphate salts.

The texture imparting agent imparts texture to the target objects. Examples of the texture imparting agent may include proteins.

The functional substance may include sugars. Using sugars as the functional substance allows impartation of texture similar to that of cotton or regenerated cellulose fibers, water absorption capability, water retention capability, and other properties.

The solvent is not limited to a specific solvent, and water and a variety of organic solvents can be used. It is, however, preferable to use water as the solvent from the viewpoint of environmental impact.

The processing liquid may contain a crosslinking agent. The crosslinking agent fixes the functional substance to the target objects by crosslinking the functional substance to the target objects. The crosslinking agent is not limited to a specific agent, and examples thereof may include epoxy-based curing agents, hydrazine-based curing agents, metal salts, melamine-based curing agents, ethyleneimine-based curing agents, carbodiimide-based curing agents, and isocyanate-based curing agents. One of the crosslinking agents described above can be used alone, or two or more of them can be used in combination.

The ratio among the components in the processing liquid can be changed as appropriate in accordance with the type, the physical properties, and other factors of the components, such as the functional substance to be used.

The processing liquid is imparted to the target objects by using the two-fluid nozzles 200, as described above. Specifically, the air compressed by the compressor 21 of the gas supplier 20 is first injected via the base end of the nozzle body 201 of each of the two-fluid nozzles 200. The compressed air flow generated in the mixing space 203 of the two-fluid nozzle 200 draws in the processing liquid and introduces the drawn-in processing liquid into the mixing space 203. The air and the processing liquid are then mixed with each other in the mixing space 203, and the processing liquid is sprayed in the form of a mist of fine particles via the nozzle hole 205 at the tip of the nozzle body 201 onto the target objects in the internal space 531 of the drum 53.

In this case, the period for which the processing liquid is sprayed is not limited to a specific period, and can, for example, be longer than or equal to 1 minute and shorter than or equal to 60 minutes, preferably, longer than or equal to 5 minutes and shorter than or equal to 40 minutes. The functional substance can thus be uniformly imparted adequately to the target objects without waste.

In the operation of spraying the processing liquid, the angle at which the processing liquid is sprayed via the two-fluid nozzle 200 is not limited to a specific angle, and can, for example, be 50° or more and 120° or less, preferably, 60° or more and 100° or less, more preferably, 70° or more and 90° or less. Employing a relatively large spray angle as described above causes the functional substance to attach more uniformly to the target objects.

The processing liquid may be sprayed at any intensity, and it is preferable to spray the processing liquid relatively weakly. The functional substance can thus be more uniformly imparted to the target objects.

It is preferable to stir the target objects in the drum 53 when the processing liquid is sprayed. The orientation of the target objects thus variously changes, so that the processing liquid attaches to the target objects more uniformly. Specifically, the driver 70 rotates the drum 53 to stir the target objects. The axis of rotation of the drum 53 extends along the horizontal direction. The target objects are therefore lifted from the bottom of the drum 53 and fall when the target objects reach near the top of the drum 53, so that the target objects are efficiently stirred.

In the present step, the target objects in the drum 53 may be stirred after the processing liquid is sprayed. The processing liquid thus penetrates the target objects, and the functional substance attaches to the target objects more reliably and uniformly. The stirring period is not limited to a specific length, and is, for example, longer than or equal to 1 minute and shorter than or equal to 60 minutes, preferably, longer than or equal to 3 minutes and shorter than or equal to 40 minutes, more preferably, longer than or equal to 5 minutes and shorter than or equal to 30 minutes.

When the target objects are stirred when or after the processing liquid is sprayed, air may be blown into the internal space 531 of the drum 53, or the target objects may be heated depending on the situation. For example, the dryer 90 can be used to blow air into the internal space 531 of the drum 53. In this process, heating the blown air by the heater 95 of the dryer 90 allows the heated air to be delivered to the internal space 531 of the drum 53, so that the target objects can be heated.

In the operation of spraying the processing liquid, water may be mixed with the processing liquid, and the mixture may be sprayed. To mix water with the processing liquid, the weight of the combination of the processing liquid and the water is set to be roughly equal to the weight of the textile products to be processed. When the weight of the combination of the processing liquid and the water is roughly equal to the weight of the textile products to be processed, the processing liquid evenly spreads all over the textile products. In addition, setting the weight of the combination of the processing liquid and the water to be roughly equal to the weight of the textile products to be processed allows elimination of the need for the step of spinning the textile products between the spray step and the drying step because the overall amount of water is small. Elimination of the spin step prevents the functional component contained in the processing liquid from being released out of the textile products, and thus improvement in the proportion of the functional substance imparted to the textile products is achieved.

Regarding the spray step, a plurality of types of processing liquids are sprayed in several stages, and the spray step may be divided into a plurality of steps in some cases. In such a case, the sum of the variety of the processing liquids having a weight roughly equal to the weight of the target to be processed are used in each of the spray steps, so that the amounts of processing liquid and water increase. When the amounts of processing liquid and water are too large, the amount of water increases, so that the spin step is necessary. According to an experiment, when the weight of the combination of the processing liquid and the water is smaller than about twice the weight of the target to be processed, the spin step is unnecessary.

[2.4. Fixation Step]

In the present step, the target objects are heated so that the functional substance is fixed to the target objects. The functional substance is thus fixed to the surfaces of the target objects. The present step can, for example, be carried out by drying and heating the target objects. Specifically, using the dryer 90 to heat the blown air with the heater 95 and blowing the heated air into the internal space 531 of the drum 53 first allows removal of the solvent, particularly water, in the target objects. After the solvent in the target objects is removed, the target objects can be heated.

The temperature of the target objects during the drying and heating operation is not limited to a specific value, and is, for example, higher than or equal to 60° C. and lower than or equal to 180° C., preferably, higher than or equal to 70° C. and lower than or equal to 110° C., more preferably, higher than or equal to 80° C. and lower than or equal to 100° C. The drying and heating period is not limited to a specific length, and is, for example, longer than or equal to 5 minutes and shorter than or equal to 300 minutes, preferably, longer than or equal to 10 minutes and shorter than or equal to 60 minutes, more preferably, longer than or equal to 20 minutes and shorter than or equal to 40 minutes.

Note that the present step is omitted as necessary depending on the types of the target objects and the functional substance.

The surfaces of the target objects can thus be modified in accordance with the function of the functional substance. In the present embodiment, the two-fluid nozzles 200 of the modification apparatus 100 are used to spray the processing liquid containing a functional substance onto the textile products and/or the leather products as the target objects to modify the target objects. As described above, using the two-fluid nozzles 200 to spray the processing liquid onto the target objects allows the functional substance to uniformly attach to the target objects, so that the target objects can be efficiently modified.

In particular, spraying the processing liquid onto the target objects with the drum 53 rotated allows the functional substance to attach to the target objects more uniformly.

3. Variations of Arrangement of Two-Fluid Nozzles

Figure 6:
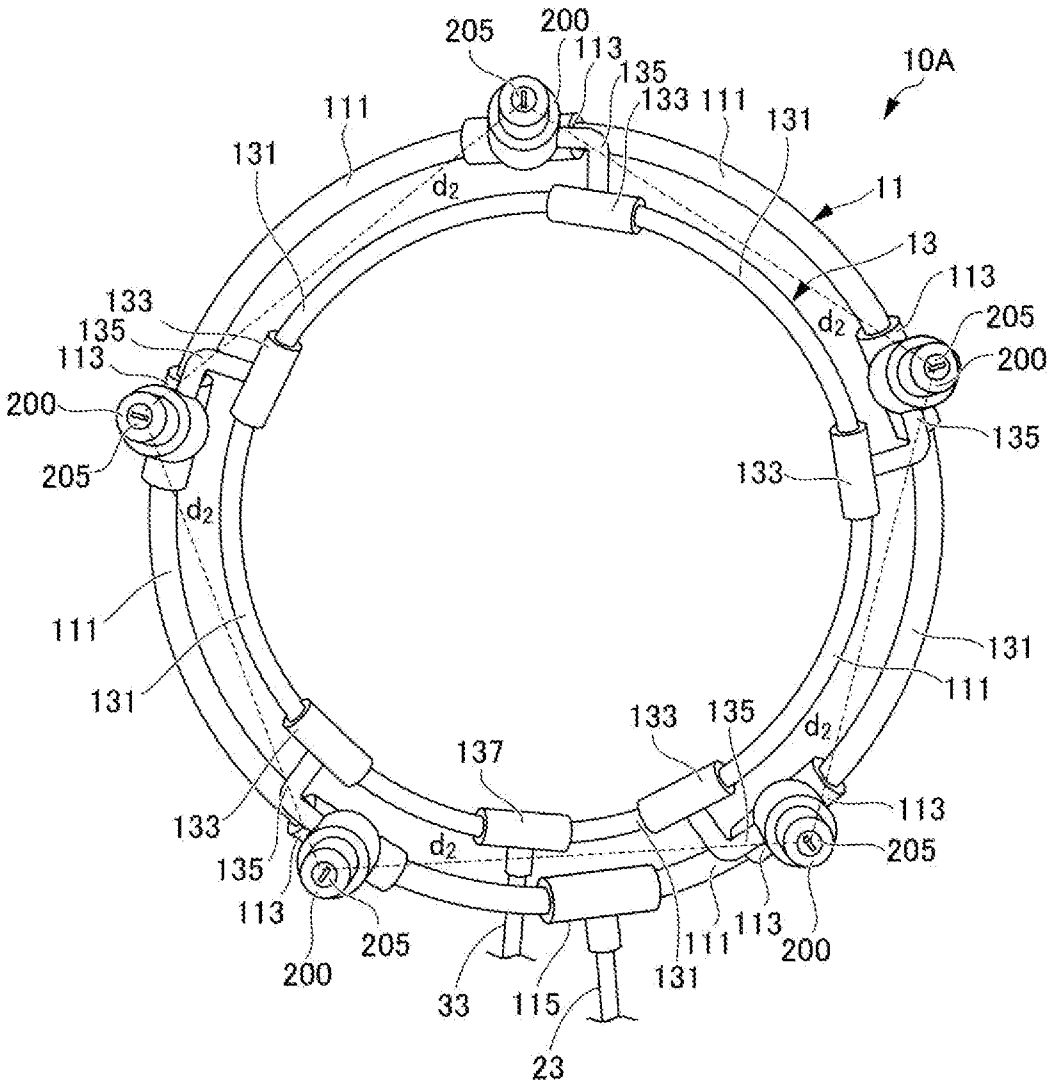
FIG. 6 is a perspective view showing another example of the spray section provided in the modification apparatus of the present invention.
Figure 7:
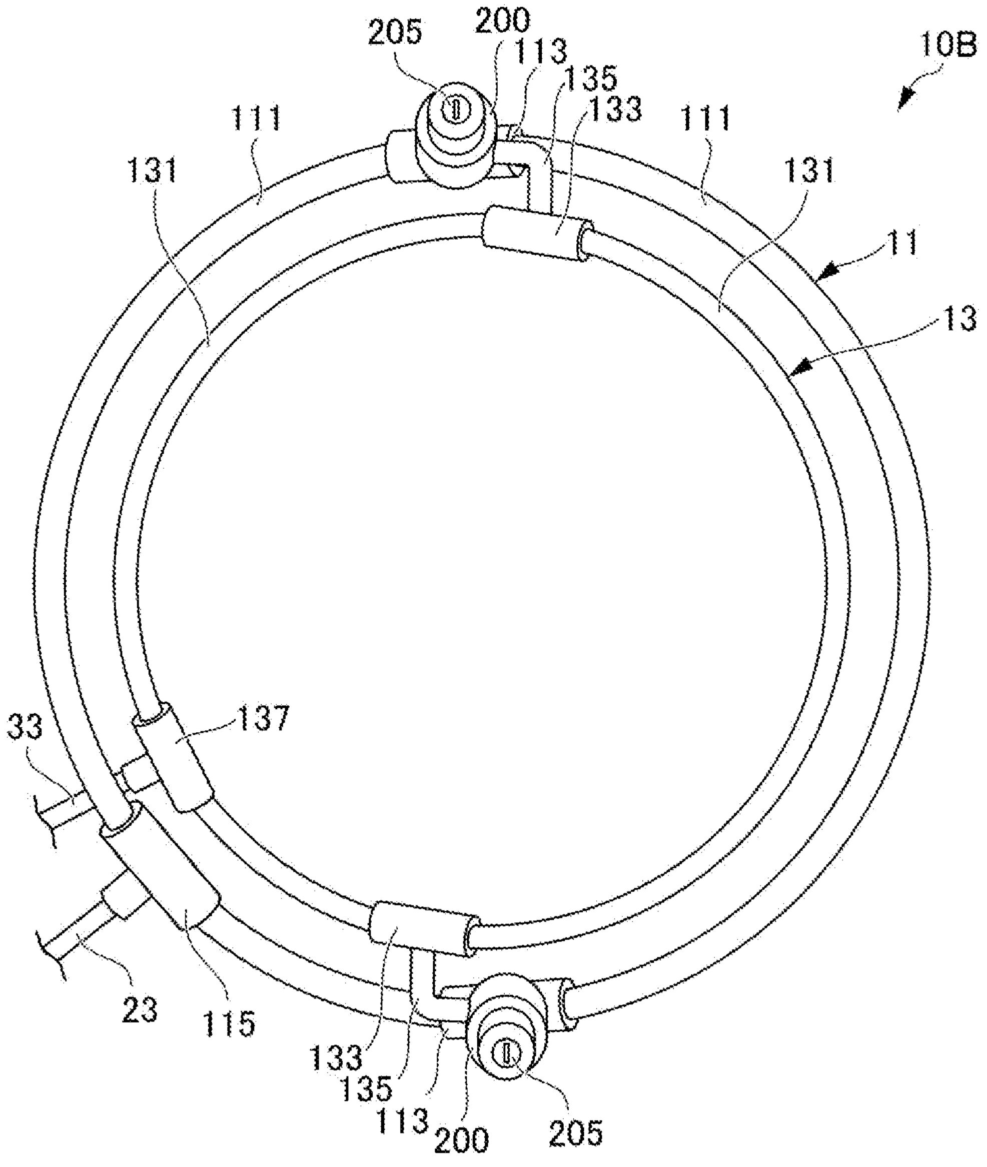
FIG. 7 is a perspective view showing another example of the spray section provided in the modification apparatus of the present invention.

The aforementioned embodiment has been described with reference to the case where the spray section 10 includes four two-fluid nozzles 200, but the present invention is not limited thereto, and any number of two-fluid nozzles can be used. FIGS. 6 and 7 are perspective views showing other examples of the spray section provided in the modification apparatus of the present invention.

In a spray section 10A shown in FIG. 6, five two-fluid nozzles 200 are so arranged that each of the two-fluid nozzles 200 is disposed apart from the adjacent two-fluid nozzles 200 by a fixed distance. More specifically, the nozzle hole 205 of each of the two-fluid nozzles 200 is disposed apart by a distance $d_2$ from the nozzle holes 205 of the adjacent two-fluid nozzles 200.

In a spray section 10B shown in FIG. 7, two two-fluid nozzles 200 are arranged at opposite positions in the annular spray section 10B.

The arrangement of the two-fluid nozzles 200 is not limited to the aspects shown in FIGS. 6 and 7, and the two-fluid nozzles 200 may not be so arranged that each of the two-fluid nozzles 200 is disposed apart from the adjacent two-fluid nozzles 200 by a fixed distance.

4. Examples 1 to 4

FIG. 8 describes Examples 1 to 4.

The method for modifying textile products and leather products according to the embodiment of the present application includes "1. preparation step," "2. wetting step," "3. processing liquid attachment step," and "4. fixation step", as described above. Regarding Examples 1 to 3, the preparation step will not be described, and the wetting step, the processing liquid attachment step, and the fixation step will be described in this order.

The modification target in each of Examples is six cotton T-shirts each weighing 150 g (approximately 900 g in total). The situation in which the amount of the modification target is around this level is preferable because the processing liquid is uniformly imparted. In the description of Examples 1 to 4 below, the term "T-shirts" to be modified refers to the six cotton T-shirts each weighing 150 g (900 g in total). The weight of the processing liquid in each of Examples 1 to 4 is the weight used to modify the six cotton T-shirts each weighing 150 g (900 g in total).

FIG. 8 will be described below. Regarding the means for attaching the functional substance to the target, Examples 1 and 4 rely on the same means used in typical wash, that is, predetermined amounts of processing liquid and water are loaded into the drum, the T-shirts to which the functional substance attaches are then loaded, and the drum is rotated for a predetermined period. The T-shirts are stirred in the water, so that the functional substance attaches to the T-shirts. Regarding the means for attaching the functional substance to the target, Examples 2 and 3 rely on the means using a nozzle, in which a predetermined amount of processing liquid mixed with a predetermined amount of water is sprayed onto the T-shirts via a nozzle. The functional substance thus attaches to the T-shirts.

Regarding the functions to be imparted (purpose of modification), the deodorizing function, the antibacterial function, the water absorption function, and the function of diffusing absorbed water are imparted in Examples 1, 2, and 3. Regarding the functions to be imparted (purpose of modification), an anti-see-through function and a sweat stain prevention function are imparted in Example 4.

Regarding the textile products to which functions are imparted, the textile products are six used T-shirts (each weighing approximately 150 g) (900 g in total) in Examples 1, 2, and 4. Example 3 is the same as the other examples in terms of the amount of T-shirts, but the textile products are unused T-shirts in place of used ones.

Regarding a refinement step, which is the step of removing fat and dirt attached to the T-shirts, Examples 1, 2, and 4 require the refinement step because the T-shirts to which functions are imparted are already used. In Example 3, in which the T-shirts are unused, requires no refinement step. Example 3, which does not include the refinement step, which uses high-temperature hot water, does not involve a high-temperature step.

Regarding the amount of water used when the processing liquid is imparted, Examples 1 and 4, in which the means for imparting the functional substance involves stirring the target objects and water in the drum, requires an amount of water 10 to 20 times the amount of the target objects, and the amount of water to be used ranges from 10 L to 20 L. Examples 2 and 3, in which the means for imparting the functional substance uses a spray via a nozzle, requires only a small amount of water. Specifically, the processing liquid only needs to spread roughly over the entire target objects, and the total weight of the processing liquid and the water is preferably about the same as the weight of the target objects.

Regarding the spin step carried out when the processing liquid is imparted, Examples 1 and 4, in which the T-shirts are stirred in a large amount of water and absorbs plenty of water, require the spin step. Examples 2 and 3, in which a small amount of water is used, do not require the spin step.

Regarding the drying means, the target objects were dried by applying hot air in Examples 1, 2, and 4, as in a dryer equipped in a typical washing machine. In Example 2 out of Examples 1, 2, and 4, since the means for imparting the functional substance used a spray via a nozzle, fixation of the functional substance was not so important, so that the step of applying hot air was not essential, but the target objects were dried by hot air because it was convenient that the hot-air-based drying did not take a long time. Regarding the drying means, the target objects were not forcibly dried by using hot air but left as they were in Example 3. When the means for imparting the functional substance uses a spray via a nozzle, the fixation of the functional substance is not so important, and the functional substance adequately attaches to the target objects without forcible drying. Involvement of a high-temperature step is therefore not required.

In comparison between Examples 1, 2, and 3 regarding the proportion of the functional substance attached to the target objects, Example 1 provides a lower attached functional substance proportion than Examples 2 and 3. The reason for this is as follows: Examples 1 to 3 are the same in terms of functions to be imparted and the amount of processing liquid used, whereas Example 1 uses a lower-concentration processing liquid than Examples 2 and 3 due to the difference in the amount of water used. In addition to this, Example 1 involves the spin step, which further removes the functional substance. In contrast, in Examples 2 and 3, the amount of water used to dilute the functional substance is large enough to cause the functional substance to evenly spread over the target to be processed, and the water containing the functional substance is not removed but remains in the drying step, a larger amount of functional substance attaches to the target objects than in Example 1.

Regarding the processing liquid, in Examples 1 to 3, a cationic processing liquid B imparts the deodorizing function in [processing 1], and anionic processing liquids C and D impart the antibacterial function in [processing 2]. In Example 4, a cationic processing liquid E imparts an anti-see-through function and a sweat stain prevention function in [processing 1], and a processing liquid F that functions as a binder for titanium is used in [processing 2].

Regarding a component that improves the adsorption of the functional chemical to the textile products, a polymeric polycationic surfactant improves the bond between the functional chemical and the textile products in Examples 1 to 3. In Example 4, an acrylic acid alkyl ester/styrene copolymer functions as the binder to improve the bond between the functional chemical and the textile products. In each of Examples 1 to 3, the functional chemical contains a component that improves the adsorption of the functional chemical to the textile products, so that it is possible that the functional chemical attaches to the textile products without involving a high-temperature step as an essential step. In Example 4, the functional chemical contains a component that improves the adsorption of the functional chemical to the textile products, so that it is possible that the functional chemical attaches to the textile products without use of a nozzle.

Regarding the characteristics of the processing liquid, the nozzle is not suitably used in Example 4 because the processing liquid clogs the nozzle, and the color (white) of the processing liquid causes stains, making it difficult to clean the nozzle. That is, when the nozzle is used after a non-colorless processing liquid is used, the color of the processing liquid sprayed in the preceding step undesirably attaches to the textile products in the subsequent step. To avoid such a situation, when a non-colorless processing liquid is used, the nozzle after use needs to be thoroughly cleaned. A non-colorless processing liquid is therefore unsuitable when a nozzle is used. When the processing liquid contains a component that is insoluble in water, such as a ceramic-based mineral, the component clogs the nozzle, so that the nozzle is not suitably used also in this case.

Therefore, in Example 4, the nozzle is not used, and a binder agent is used so that the functional substance attaches to the textile products without use of the nozzle.

In the JIS L1930 wash resistance test, in all of Examples 1 to 4, there was no change in the attachment of the functional substance after the target objects were washed ten times, but the function of the functional substance was maintained.

The modification apparatus 100 having the configuration described above can effectively impart a chemical to the textile products by using the nozzle. In addition to this, the chemical can also be imparted to the textile products by directly loading the chemical into the drum without using the nozzle and stirring the target textile products with water. Therefore, in the operation of imparting an appropriate chemical to the surfaces of the textile products in an appropriate order for modification, the modification apparatus 100 is easily ready not to use the nozzle when the processing liquid is unsuitable for use of the nozzle or ready to use the nozzle when the processing liquid is suitable for use of the nozzle in accordance with the properties of the processing liquid (chemical).

Example 1

[Wetting Step]

The T-shirts described above are loaded into the internal space 531 of the drum 53, and water (at room temperature, the same applies hereinafter) is loaded from the water supplier 80. The drum is then rotated for 10 minutes to stir the T-shirts in the water flow. The water is then removed via the drain port 513. Finally, the drum is rotated to spin the T-shirts.

[Processing Liquid Attachment Step]

(1) Pre-Processing

Fat and dirt attached to the T-shirts are removed by using a processing liquid A. The processing liquid A is a refining agent.

Processing liquid A: Slightly yellow transparent liquid, nonionic, 9 g

TABLE 1

| Components of processing liquid A | |
|---|---|
| Nonionic surfactant | 56% |
| Methanol | 4% |
| Water | 40% |

Hot water having a temperature ranging from 70° C. to 80° C. and having a volume ranging from 10 L to 20 L (roughly equal to the amount of hot water loaded into the drum in Example 1 below), 9 g of the processing liquid A, and the T-shirts are loaded into the drum, the T-shirts are stirred in the hot water for 10 minutes, and then the hot water is drained to spin the T-shirts. Note that the mechanism for converting the water supplied into the drum into hot water is an existing means. Water is then loaded into the drum, the T-shirts are stirred in the water for 4 minutes, and then the water is drained to spin the T-shirts. Hot water having the temperature ranging from 70° C. to 80° C. is then loaded into the drum, the T-shirts are stirred in the hot water for 10 minutes, and then the hot water is drained to spin the T-shirts. Water is then loaded into the drum, the T-shirts are stirred in the water for 3 minutes, and then the water is drained to spin the T-shirts. Finally, water is loaded into the drum again, the T-shirts are stirred in the water for 3 minutes, and then the water is drained to spin the T-shirts.

(2) Processing 1

A processing liquid B is used to impart the deodorizing function to the T-shirts.

Processing liquid B: greenish white dispersed liquid, cationic, 40.5 g

TABLE 2

| Components of processing liquid B | |
|---|---|
| Polycation surfactant | 15 to 25% |
| Silicon dioxide | 5 to 15% |
| Inorganic salt | 1.1% |
| Water | 58.9 to 78.9% |

Hot water having a temperature of about 40° C., 40.5 g of the processing liquid B, and the T-shirts are loaded into the drum, the T-shirts are stirred in the hot water for about 15 minutes, and then the hot water is drained to spin the T-shirts.

(3) Processing 2

The processing liquids C and D are used to impart an antibacterial function and a water absorption and diffusion function to the T-shirts.

Processing liquid C: Milky white emulsion, 63 g

TABLE 3

| Components of processing liquid C | |
|---|---|
| Zinc oxide | 15 to 35% |
| Aluminum oxide | 1 to 10% |
| Water | 58 to 84% |

Processing liquid D: Pale yellowish white liquid, amphoteric, 45 g

TABLE 4

| Components of processing liquid D | |
|---|---|
| Amino-silicone emulsion | 40% |
| Water | 60% |

Hot water having the temperature of about 40° C., 63 g of the processing liquid C, 45 g of the processing liquid D, and the T-shirts are loaded into the drum, the T-shirts are stirred in the hot water for about 15 minutes, and then the hot water is drained to spin the T-shirts for 1 minute.

[Fixation Step]

The T-shirts are dried with hot air applied thereto, and at the same time, the functional substance is fixed to the target objects. Specifically, the dryer 90 is used to apply air having a temperature of about 90° C. for 10 to 15 minutes.

Example 2

[Wetting Step]

The wetting step is the same as that in Example 1 and is therefore not described.

[Processing Liquid Attachment Step]

(1) Pre-Processing

The pre-processing is the same as (1) the pre-processing in the [processing liquid attachment step] in Example 1 and is therefore not described.

(2) Processing 1

The processing liquid B is used to impart the deodorizing function to the T-shirts.

Processing liquid B: greenish white dispersed liquid, cationic, 40.5 g

TABLE 5

| Components of processing liquid B | |
|---|---|
| Polycation surfactant | 15 to 25% |
| Silicon dioxide | 5 to 15% |
| Inorganic salt | 1.1% |
| Water | 58.9 to 78.9% |

The processing liquid B having a weight of 40.5 g and water having a weight of approximately 859.5 g are loaded into the processing liquid storage 31. The combination of the processing liquid B and the water has a weight of 900 g, which is the weight of the T-shirts. The T-shirts are loaded into the drum, and the processing liquid B is sprayed onto the T-shirts via the two-fluid nozzles 200. In this process, the drum is rotated to stir the T-shirts during the spray.

(3) Processing 2

The processing liquids C and D are used to impart the antibacterial function and the water absorption and diffusion function to the T-shirts.

Processing liquid C: Milky white emulsion, 63 g

TABLE 6

| Components of processing liquid C | |
|---|---|
| Zinc oxide | 15 to 35% |
| Aluminum oxide | 1 to 10% |
| Water | 58 to 84% |

Processing liquid D: Pale yellowish white liquid, amphoteric, 45 g

TABLE 7

| Components of processing liquid D | |
|---|---|
| Amino-silicone emulsion | 40% |
| Water | 60% |

The processing liquid C having a weight of 63 g, the processing liquid D having a weight of 45 g, and water having a weight of 792 g are loaded into the processing liquid storage 31. The combination of the processing liquids C and D and the water has the weight of 900 g, which is the weight of the T-shirts. The T-shirts are loaded into the drum, and the processing liquids C and D and the water are sprayed onto the T-shirts via the two-fluid nozzles 200. In this process, the drum is rotated to stir the T-shirts during the spray.

[Fixation Step]

The T-shirts are dried with hot air applied thereto, and at the same time, the fixation of the functional substance to the target objects is strengthened. Specifically, the dryer 90 is used to apply air having the temperature of about 90° C. for 20 to 30 minutes.

Example 3

[Wetting Step]

The wetting step is the same as that in Example 1 and is therefore not described.

[Processing Liquid Attachment Step]

(1) No pre-processing (refinement) is performed.

(2) Processing 1

The processing 1 is the same as (2) the processing 1 in the [processing liquid attachment step] in Example 2 and is therefore not described.

(3) Processing 2

The processing 2 is the same as (3) the processing 2 in the [processing liquid attachment step] in Example 2 and is therefore not described.

[Fixation step] is not carried out. The target objects are hung in a well-ventilated place so as to be left as they are without forcible drying.

Example 4

[Wetting Step]

The wetting step is the same as that in Example 1 and is therefore not described.

[Processing Liquid Attachment Step]

(1) Pre-Processing

The pre-processing is the same as (1) the pre-processing in the [processing liquid attachment step] in Example 1 and is therefore not described.

(2) Processing 1

The processing liquid E is used to impart the anti-see-through function and the sweat stain prevention function to the T-shirts.

Processing liquid E: Milky white emulsion, cationic, 72 g

TABLE 8

| Components of processing liquid E | |
|---|---|
| Titanium dioxide | 45 to 50% |
| Glycols | 5 to 10% |
| Polymer compound (cationic dispersant) | 5 to 10% |
| Water | 30 to 35% |

Water having a volume ranging from 10 L to 20 L, 72 g of the processing liquid E, and the T-shirts are loaded into the drum, T-shirts are stirred in the water for about 30 minutes, and then the water is drained to spin the T-shirts.

(3) Processing 2

The processing liquid F is a binder that allows the processing liquid E to be bonded to the T-shirts.

Processing liquid F: Milky white emulsion, 45 g

TABLE 9

| Components of processing liquid F | |
|---|---|
| Acrylic acid alkyl ester/styrene copolymer | 39% |
| Surfactant | 1% |
| Water | 60% |

Water having the volume ranging from 10 L to 20 L, 45 g of the processing liquid F, and the T-shirts are loaded into the drum, T-shirts are stirred in the water for about 30 minutes, and then the water is drained to spin the T-shirts for 1 minute.

[Fixation Step]

The T-shirts are dried with hot air applied thereto, and at the same time, the fixation of the functional substance to the target objects is strengthened. Specifically, the dryer 90 is used to apply air having the temperature of 90° C. for 10 to 15 minutes.

REFERENCE SIGNS LIST

10, 10A, 10B Spray section
11 Gas distributor
111 Tube
113 Joint
1131 Branch pipe
115 Linkage section
13 Processing liquid distributor
131 Tube
133 Joint
135 Branch pipe
137 Linkage section
20 Gas supplier
21 Compressor
23 Gas supply tube
25 Pressure regulating valve
30 Processing liquid supplier
31 Processing liquid storage
33 Processing liquid supply tube
40 Enclosure
41 Enclosure body
411 Storage space
413 Loading port
43 Panel section
45 Detergent loader
47 Opening/closing door
471 Door body
473 Bottom
475 Window
50 Wash tub
51 Outer tub
513 Drain port
60 Support
61 Spring
63 Damper
70 Driver
71 Drive motor
73 Drive shaft
80 Water supplier
81 Distributor
83 Detergent supply pipe
831, 851 Nozzle
85 Water supply pipe
87 Cooling water supply pipe

90 Dryer
91 Air blower
93 Air blow pipe
931 Air blow nozzle
95 Heater
97 Recovery pipe
99 Heat exchanger
100 Modification apparatus
200 Two-fluid nozzle
201 Nozzle body
203 Mixing space
205 Nozzle hole
207 Gas injection hole
209 Processing liquid injection hole

What is claimed is:

1. An apparatus for modifying textile products and leather products, the apparatus comprising:

a storage tub having an internal space that stores the textile products and/or the leather products; and a spray section that sprays a processing liquid containing a functional substance along with a gas toward the textile products and/or the leather products in the internal space of the storage tub, wherein the spray section includes a plurality of two-fluid nozzles, a gas supplier that supplies the two-fluid nozzles with the gas, and a processing liquid supplier that supplies the two-fluid nozzles with the processing liquid, the gas supplier has an annular shape, and the plurality of two-fluid nozzles are each supported by the gas supplier and disposed apart from adjacent ones of the two-fluid nozzles by a fixed distance.

2. The apparatus for modifying textile products and leather products according to claim 1, wherein the storage tub is rotatable.

3. The apparatus for modifying textile products and leather products according to claim 2, wherein an axis of rotation of the storage tub inclines with respect to a vertical direction or extends along a horizontal direction.

4. The apparatus for modifying textile products and leather products according to claim 1, further comprising a heating apparatus capable of heating the internal space of the storage tub.

5. The apparatus for modifying textile products and leather products according to claim 1, wherein the apparatus is a washing machine.

* * * * *